United States Patent [19]

Chen

[11] 4,451,623

[45] May 29, 1984

[54] WATER SOLUBLE PHENOLIC-FORMALDEHYDE POLYMER WHICH IS A SURFACTANT MOBILITY CONTROL AGENT IN OIL RECOVERY

[75] Inventor: Catherine S. H. Chen, Berkeley Heights, N.J.

[73] Assignee: Mobil Oil Corporation, New York, N.Y.

[21] Appl. No.: 421,592

[22] Filed: Sep. 22, 1982

Related U.S. Application Data

[62] Division of Ser. No. 225,573, Jan. 16, 1981, Pat. No. 4,374,740.

[51] Int. Cl.$^3$ .......................... C08G 8/28; C08G 8/36
[52] U.S. Cl. ..................................... 525/505; 525/507; 528/107; 528/109; 528/153; 528/158; 528/129
[58] Field of Search ............... 528/153, 158, 107, 109; 525/505, 507, 129

[56] References Cited

U.S. PATENT DOCUMENTS

| | | | |
|---|---|---|---|
| 2,454,543 | 11/1948 | Bock et al. | 528/158 |
| 3,352,358 | 11/1967 | Williams | 166/9 |
| 3,398,094 | 8/1968 | Blatz et al. | 252/8.55 |
| 3,530,938 | 9/1970 | Cooper | 166/273 |
| 3,583,486 | 6/1971 | Stratton | 252/8.55 X |
| 3,659,650 | 5/1972 | Stratton | 252/8.55 X |
| 3,956,241 | 5/1976 | Steele et al. | 528/109 X |
| 3,977,471 | 8/1976 | Gale et al. | 252/8.55 X |
| 4,222,881 | 9/1980 | Byham et al. | 252/8.55 D |
| 4,226,731 | 10/1980 | Hunter | 252/8.55 |

*Primary Examiner*—Howard E. Schain
*Attorney, Agent, or Firm*—Alexander J. McKillop; Michael G. Gilman; James P. O'Sullivan, Sr.

[57] ABSTRACT

Certain water-soluble substituted phenol formaldehyde type copolymers retain their viscosities in high brine environments and are highly useful as surfactant-mobility control agents in oil recovery processes.

8 Claims, No Drawings

WATER SOLUBLE PHENOLIC-FORMALDEHYDE POLYMER WHICH IS A SURFACTANT MOBILITY CONTROL AGENT IN OIL RECOVERY

This is a division of application Ser. No. 225,573 filed Jan. 16, 1981, now U.S. Pat. No. 4,374,740.

BACKGROUND OF THE INVENTION

1. Field of the Invention

This invention is directed to novel synthetic water-soluble polymers and their use as surfactant-mobility control agents in oil recovery processes.

2. Description of the Prior Art

In the recovery of oil from oil-bearing reservoirs, it usually is possible to recover only minor portions of the original oil in place by the so-called primary recovery methods which utilize only the natural forces present in the reservoir. Thus a variety of supplemental recovery techniques have been employed in order to increase the recovery of oil from subterranean reservoirs. The most widely used supplemental recovery technique is waterflooding which involves the injection of water into an oil-bearing reservoir. As the water moves through the reservoir, it acts to displace oil therein to a production system composed of one or more wells through which the oil is recovered.

One difficulty often encountered in waterflooding operations in the relatively poor sweep efficiency of the aqueous displacing medium; that is, the injected displacing medium tends to channel through certain portions of the reservoir as it travels from the injection system to the production system and to bypass other portions. Such poor sweep efficiency or macroscopic displacement efficiency may be due to a number of factors such as differences in the mobilities of the injected displacing liquids and the displaced reservoir oil and permeability variations within the reservoir which encourage preferential flow through some portions of the reservoir at the expense of other portions.

Various techniques have been proposed in order to improve the sweep efficiency of the injected displacing medium and thus avoid premature breakthrough at one or more of the wells comprising the production system. The most widely used procedure involves the addition of thickening agents to the injected displacing medium in order to increase the viscosity thereof and thus decrease its mobility to a value equal to or less than the mobility of the displaced reservoir oil, resulting in a "mobility ratio" of oil to water which is less than or equal to one. Many polymeric thickening agents including both anionic and cationic polyelectrolytes have been proposed for use in such mobility control operations. Thus, U.S. Pat. No. 3,085,063 discloses waterflooding in which the water is thickened by the addition of polyvinyl aromatic sulfonates such as sulfonated polystyrene and copolymers of such vinyl aromatic sulfonates. Similarly, U.S. Pat. No. 3,984,333 discloses waterflooding involving the injection of an aqueous solution thickened by block copolymers in which the water-soluble blocks are sulfonated polyvinylarenes and the relatively water-insoluble blocks are polymerized alpha olefins and/or hydrogenated dienes such as polyisoprene and polybutadiene. Synthetic anionic polymers such as those disclosed in the patents discussed above, as well as the more widely used partially hydrolyzed polyacrylamides, suffer a number of disadvantages in actual operations. Where the injected water or the reservoir water contains significant quantities of dissolved inorganic salts, their viscosity yield is decreased materially. Also U.S. Pat. No. 3,969,592 discloses water-soluble polymers manufactured by treating an aqueous suspension of protein with selected enzymes.

Also U.S. Pat. No. 4,110,232 discloses a waterflooding process for producing oil wherein an aqueous solution of a copolymer formed of hydrophobic olefinic segments and cationic aromatic segments is injected into oil-containing subterranean formation, and U.S. Pat. No. 4,222,881 discloses a waterflood oil recovery process involving the use of an amphoteric polyelectrolyte as a thickening agent for mobility control comprising a copolymer of a quaternary vinyl pyridinium sulfonate-styrene block copolymers.

SUMMARY OF THE INVENTION

In accordance with the present invention, there are provided novel synthetic compounds which are water-soluble polymers capable of thickening water and which retain their thickening power even in the presence of excess amounts of small electrolytes.

Most water-soluble polymers lose their thickening power in the presence of salts or other electrolytes. The loss of thickening power is due to the change of conformation of the polymer chains. In distilled water, due to charge repulsion of neighboring groups, the polymer chains exist in a highly extended conformation which results in a large hydrodynamic volume and consequently a high solution viscosity. In the presence of excess small electrolytes, due to charge screening the polymer chains exist in a coiled conformation which results in a small hydrodynamic volume and consequently a low solution viscosity. In oil recovery from most reservoirs the polymers must function under a brine environment. To date only certain polysaccharides, such as xanthan gum, have been found to maintain a reasonable viscosity in high brine solutions. This solution property of the polysaccharides appears to be attributable to the transformation to the stiff helical comformation in the presence of electrolytes. Accordingly, the ability of the novel polymers disclosed herein to retain their thickening power in the presence of excess amounts of electrolytes is believed to result from the stiff backbone of the polymer made up of alternating methylene groups and aromatic rings which cannot coil. The usual more flexible water-soluble polymers coil and become more compact in the presence of electrolytes, consequently lose water thickening power. In addition to the rigid backbone, hydrophilic groups are spaced along the backbone to render the polymer water soluble and to give it surfactant properties.

Further, the novel polymers in accordance herewith are hydrolytically stable in contrast to the above-described polysaccharides which easily hydrolytically degrade through the unstable hemiacetal linkages in the polymer main and side chains. The constituent monomers have the hydrophobic-hydrophilic balance to produce ultra-low tensions between oil and water phases and the associative property of the molecules due to the presence of hydrophobic and hydrophilic parts enhances the thickening power of the polymer.

DESCRIPTION OF PREFERRED EMBODIMENTS

The synthesis of the polymers discloses herein may be summarized as follows:

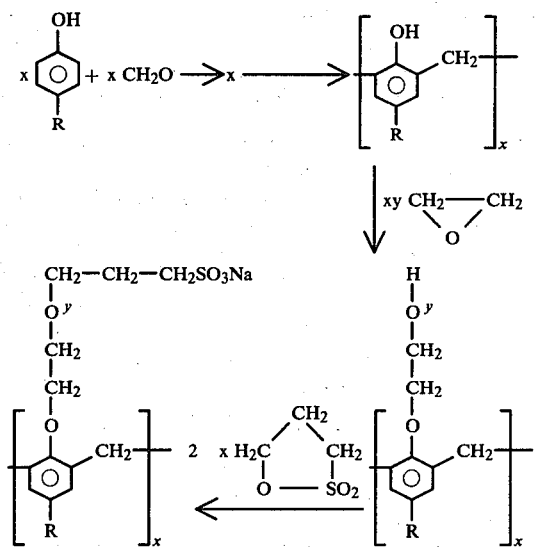

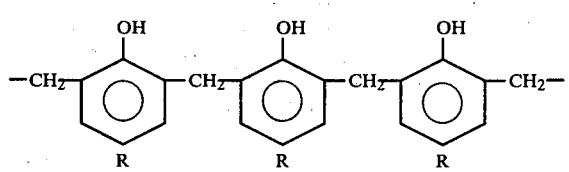

R is alkyl such as nonyl ($C_9H_{19}$) having from about 1 to 30 carbon atoms or aryl such as phenyl or alkyl-aryl, preferably R is alkyl.

x is 10 to 1000, preferably >100.

y is 2 to 10, preferably 3 to 5.

The main chain consists of

The reaction generally takes place at temperatures of from about 80° C. to 140° C., at atmospheric pressures.

The following examples illustrate the synthesis of the above-described polymers and as understood by those of ordinary skill in the art, obvious variations may be resorted to within the scope of the herein-described invention.

The basic components utilized in the inventive process may be obtained commercially or synthesized if desired by any convenient means known to the art. Their preparation is therefore not a part of the novel invention disclosed herein. The copolymers formed as a result of said components reacting having a molecular weight within the range of 10,000 to 10,000,000 and preferably 50,000 to 5,000,000.

EXAMPLE 1

A 1000 ml cyclohexanol solution containing 220 grams of highly purified p-nonylphenol, 34.5 grams of p-formaldehyde (mole ratio of formaldehyde to nonylphenol was such as not to exceed 6 to 7) and 2 grams of p-toluene sulfonic acid as a catalyst was heated under $N_2$ slowly to reflux. At reflux, water was formed from the polymerization and was removed by azeotrope until no more water was formed. Much of the cyclohexanol was then distilled off under vacuum. Excess water was then added whereby the polymer precipitated out. The polymer was washed with water and dried.

The dried polymer was dissolved in acetonitrile and refluxed to remove any residual water by azeotrope. The solution was cooled down and transferred to a pressure vessel, 2 grams of triethanolamine (catalyst) and 150 grams of ethyleneoxide were then added. The reaction mixture was heated at 60° C. for 2 hours. At the end of the reaction, the mixture was dialyzed against water to remove any low molecular weight material and the polymer was recovered by freeze-drying.

EXAMPLE 2

To 355 grams of the polymer prepared in Example 1 dissolved in tetrohydeofuran were added slowly 23 grams of metallic sodium under nitrogen atmosphere. The mixture was refluxed until all sodium was reacted. The reaction mixture was then cooled down and 106 grams of predistilled propane sultone were then added. The mixture was refluxed overnight under nitrogen atmosphere. After distilling off much of the tetrohydrofuran, water was added to dissolve the polymer. The aqueous solution was dialyzed to remove any low molecular weight material that might be present and freeze-dried to recover the polymer.

The novel water-soluble polymers of this invention are effective coagulants for a variety of suspensions.

Solutions of the novel water-soluble polymers of this invention are primarily used in the tertiary recovery of petroleum from spent oil wells. As an example of this, a solution of the polymer of up to about 2 percent concentration is introduced by injection into an oil-bearing formation. A surfactant such as petroleum sulfonate (alkyl polyethoxypropane sulfonate) may then be mixed with the novel water soluble polymer in concentrations of up to 2 percent. However, since the polymers in accordance with the invention have surfactant properties, lower concentrations of a surfactant per se need be used. However, the invention is not limited to the above concentrations or methods. The polymer is added to water injected into the oil-containing formation in a sufficient amount and concentration to effectively thicken the water so as to provide improved efficiency in driving the oil through the formation to the production well. Generally from about 0.1 to about 5 percent of the polymer described herein is used.

To demonstrate the improved thickening properties of the polymers in accordance herewith, selected aliquots of mixed aqueous brine solutions were prepared. In each of the brines employed, the divalent metal ions were present in the form of their chloride salts. In describing the invention and the supporting experimental data, weight percents set forth herein are calculated on a weight (solute)/volume (solution) basis. Thus, brine, for example, had a total dissolved salts content of grams per deciliter of solution.

The polymer gives enhanced viscosities to brines A, B, C, and D. The higher the molecular weight the smaller amount of the polymer is needed to achieve the same thickening power. For example, a 0.5 percent solution of the polymer of $1 \times 10^6$ molecular weight in brine A, B, C or D will increase the viscosity of the brines 5 to 10 times. The nature of the brine does not affect the thickening power in a substantial manner. In other words, the polymer is not sensitive to small electrolytes in viscosity enhancement.

Brines A, B, C and D had the following respective characteristics.

A. West Burkburnett brine: 13.2 wt. percent NaCl, 9500 ppm calcium ions and 1877 ppm magnesium ions to provide a total salinity of 16.6 wt. percent.

B. 10 percent FRL mixed brine: 6.4 percent wt. percent NaCl, 9272 ppm calcium ions and 2552 ppm magnesium ion to provide a total salinity of 10 wt. percent.

C. West Ranch brine: 6.2 wt. percent NaCl, 250 ppm magnesium ions, 1160 ppm calcium ions, and 92 ppm barium ions to provide a total salinity of 6.6 wt. percent.

D. 6 percent FRL mixed brine: 3.9 wt. percent NaCl, 5563 ppm calcium ions, and 1531 ppm magnesium ions to provide a total salinity of 6.0 wt. percent.

I claim:

1. A process for manufacturing water-soluble polymers that thicken water comprising the following general reaction:

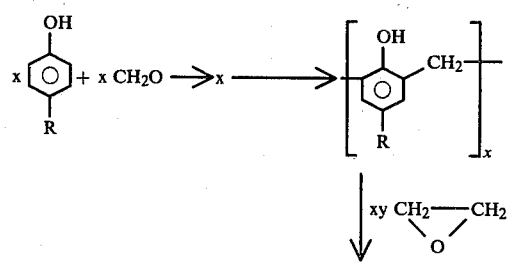

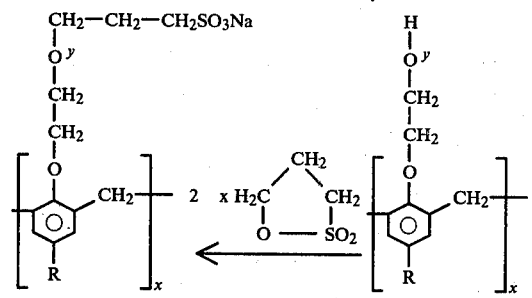

R is alkyl having from about 1 to 30 carbon atoms or aryl or alkylaryl,
x is 100 to 1000 and
y is 2 to 10.
2. The process of claim 1 in which R is alkyl.
3. The process of claim 2 in which R is $C_9H_{19}$.
4. A polymer produced by the process of claim 1.
5. The polymer of claim 4 in which R is alkyl.
6. The polymer of claim 5 in which R is $C_9H_{19}$.
7. The polymer of claim 4 in which said polymer has a molecular weight of from about 10,000 to 10,000,000.
8. The polymer of claim 4 in which said polymer has a molecular weight of from about 50,000 to 5,000,000.

* * * * *